Dec. 13, 1960     C. H. TEESDALE     2,963,883
ICE CREAM VENDOR

Filed March 12, 1956     2 Sheets-Sheet 1

INVENTOR.
Clyde H. Teesdale
BY
Lloyd A. Heneveld
ATTORNEY

Dec. 13, 1960

C. H. TEESDALE 2,963,883

ICE CREAM VENDOR

Filed March 12, 1956

INVENTOR.
Clyde H. Teesdale
BY

ATTORNEY

United States Patent Office 2,963,883
Patented Dec. 13, 1960

2,963,883

ICE CREAM VENDOR

Clyde H. Teesdale, Grand Rapids, Mich., assignor to Rufus S. Teesdale, Grand Rapids, Mich.

Filed Mar. 12, 1956, Ser. No. 570,990

2 Claims. (Cl. 62—331)

This invention relates to a method and apparatus for vending frozen articles. More particularly this invention relates to a method and apparatus for vending ice cream in conjunction with unfrozen dairy products such as milk, and butter.

Automatic vending machines requiring no full time attendant have become very popular in the last few years. These automatic vending machines are operated by the purchaser dropping the required amount of money in a coin box which in turn operates the machine and causes it to dispense the selected article. Various and different type machines have been devised for vending various articles. This invention pertains to a vending machine and vending method for frozen articles particularly ice cream. It is also designed for dispensing milk and other dairy products.

One difficulty experienced in dispensing ice cream or other frozen articles from a sharp-freezing compartment to a humid and warm atmosphere outside the vending machine is the accumulation of frost and icing on the dispensing outlet and dispensing mechanism. The accumulation of frost on the dispensed article also results and is very annoying to the customer. The accumulation of frost and icing on the dispensing outlet and mechanism frequently has an adverse effect upon the operation of the machine. This frost and icing results from the humid air outside the machine flowing into the machine and almost instantaneously condensing and freezing.

Another difficulty experienced in dispensing frozen articles is the large quantity of cool air lost while filling the machine. In filling the machine directly from the outside the cool air escapes raising the temperature inside the sharp-freezing compartment. The hot and humid outside air also flows into the freezing compartment and immediately upon striking the cold wettable surfaces therein condenses and freezes forming frost and ice on the different parts of the machine. This frosting condition increases with difference in temperature between the outside and inside of the machine.

If the vending machine is sufficiently large for a person to enter into the freezing compartment, the attendant of the machine in passing from the warm and humid exterior to the sharp freezing compartment, is subjected to extreme temperature changes which imperils the attendant's health.

A primary object of this invention is to eliminate these difficulties.

A further object of this invention is to provide a vending machine for frozen articles, such vending machine being easily filled without imperiling the health of the attendant.

Still another object of this invention is to provide a vending machine and vending method for frozen articles in which frosting and icing caused by the condensing and freezing of the outside air is substantially entirely eliminated.

A further object of this invention is to provide a method and apparatus for dispensing frozen articles from a sharp freezing compartment to a relatively high and humid atmosphere without forming and accumulating large quantities of frost or icing. Other objects of this invention will become obvious upon reading the following specification in conjunction with the accompanied drawings wherein.

Briefly, this invention is concerned with a vending machine for vending frozen articles such as ice cream. Two compartments are provided in the machine, one a sharp freezing compartment and the other maintained at a temperature slightly above freezing. A conveyor is provided for conveying frozen articles stored in the sharp freezing compartment to a dispensing outlet. This conveyor passes through the above freezing compartment. Thus frosting or icing of the mechanism or dispensing outlet normally caused by the condensation of the humid and hot air surrounding the machine is eliminated. In the broadest aspect of the method of this invention, the frozen articles are dispensed from a sharp freezing compartment to a high temperature zone by the step of passing the articles through an intermediate zone or zones of graduated temperature. In a narrower aspect unfrozen dairy products are dispensed directly from the slightly above freezing compartment.

Figure 1:
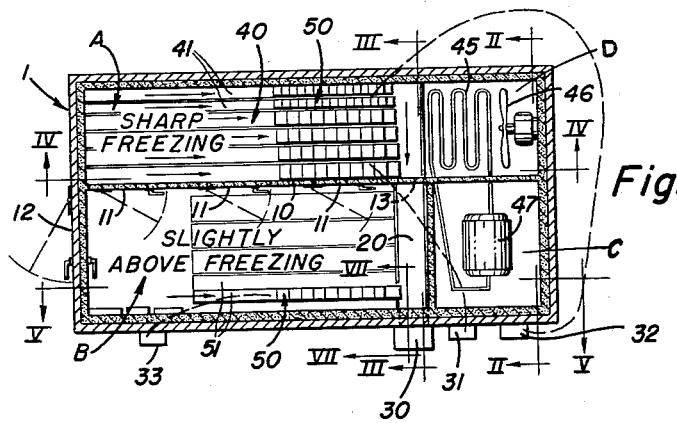
Fig. 1 is a plan view of the vending machine illustrating the apparatus and method of this invention.

Referring to the drawing, Fig. 1 shows a housing 1 having a sharp freezing zone or compartment A and a slightly above freezing zone or compartment B. Compartments A and B are separated by a partition 10 having several doors 11 providing access to compartment A from compartment B. The compartment B has an entrance door 12 leading to the outside of the housing. The entire exterior of the housing is fabricated of a protective facing having a six inch insulation backing. The partition 11 has 2½ inch insulation.

The conveyor 20, described in detail hereinafter, runs transversely of the compartments A and B through an opening 13 in panel 11 to the outlet chute 30. The compartment A has a dispensing mechanism 40 for storing frozen articles, such as ice cream, and dispensing them on the conveyor 20 upon actuation of the coin mechanism 31 or 32 on the outside of the housing thus, dispensing frozen articles from compartment A to the outside of the machine, the articles pass through compartment B to the outlet chute 30. The compartment B also has a dispensing mechanism for nonfrozen dairy products such as milk. This mechanism dispenses the dairy products on conveyor 20 in response to the actuation of the coin mechanism 33 on the outside of the housing.

Figure 3:
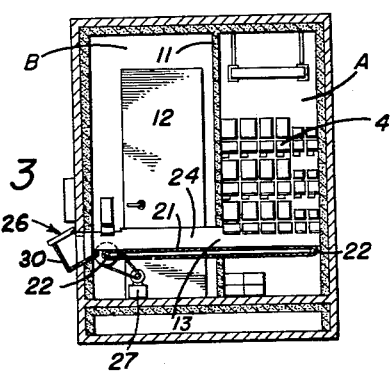
Fig. 3 is a cross sectional view taken along the plane III—III of Fig. 1.
Figure 2:
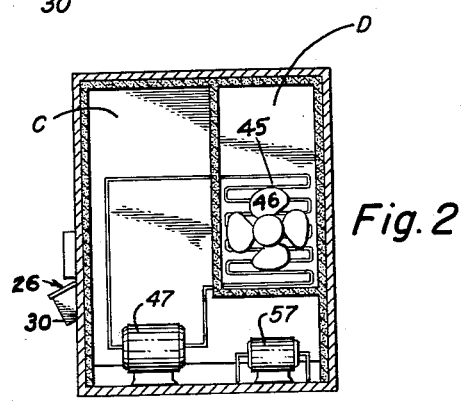
Fig. 2 is a cross sectional end view taken along the plane II—II of Fig. 1.
Figure 4:
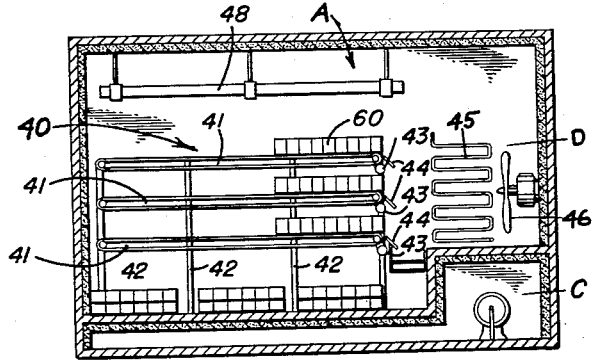
Fig. 4 is a front, cross sectional view taken along the plane IV—IV of Fig. 1 and illustrating the dispensing mechanism for the frozen articles.

Figs. 2, 3 and 4 show in more detail the specific dispensing and storage mechanism 40 for the frozen articles 50. The storage and dispensing mechanism 40 includes several tiers of conveyors 41. These conveyors are mounted and arranged in spaced relationship to each other by the standards 42. The conveyors 41 can be of any conventional type adapted for step by step actuating. The conveyors 41 are actuated by motors 43. The conveyors I prefer to use, although not specifically shown and illustrated in these drawings, are the chain type which are constructed of two parallel chains having slats secured between them for supporting the article. The chains are engaged by sprockets which are in turn actuated by the motors 43.

In the preferred form of this invention (Fig. 1) the conveyors are arranged in rows longitudinally of the sharp freezing compartment A. Each row consists of a pair of parallel chains having slats secured between them. The rows can be actuated by motors 43 either individually or in groups depending upon the different types and kinds of articles being sold. For example, each row can contain a different flavor and carton size of ice cream, in which case a motor is provided for each row.

It is frequently desirable to actuate several rows with one motor. In such a case, all of the rows in one group contain the same article, that is, the same flavor and size container of ice cream.

This arrangement restricts the number of different types of articles but it increases the number of each kind of article that can be sold without reloading the machine.

Each of the tiers of conveyors have a chute at the end near the conveyor 20. Chutes 44 direct the article into the conveyor 20. If one motor 43 actuates a group of rows, each containing the same article, the top of the chute is arranged at an angle to the rows as shown in Fig. 1, thus permitting only one article at a time to slide off the conveyor 41 into the conveyor 20. This conveyor arrangement is conventional. Any type conveyor arrangement can be substituted therefore without departing from the scope of this invention.

The conveyors 41 are spaced sufficiently above the floor to provide a storage space for ice cream and other frozen articles. This storage space decreases the frequency of transporting frozen articles to the unit.

The coils 45 and fan 46 are located at substantially the same level as the conveyors 41. The compressor 47 for the refrigerating unit is located in a separate compartment C at the end of the housing. Compartment C is insulated from both compartments A and B. From the end view as shown in Fig. 2 it is L-shaped leaving a space D for the coils 45 and fan 46. Space D is considered a part of the compartment A.

The compartment A also has a brine tank 48 that is a hollow flat plate located immediately above the conveyor 41. Brine tank 48 helps to maintain the temperature of compartment A below freezing if the compressor fails by reason of power or otherwise.

Figure 5:
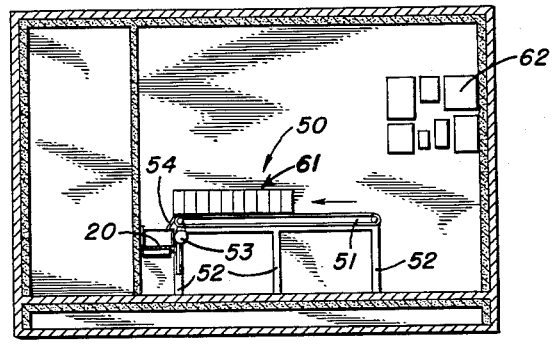
Fig. 5 is a cross sectional view taken along the plane V—V of Fig. 1 and illustrating the dispensing mechanism for the unfrozen dairy products.

The compartment B is shown in more detail in Figs. 3 and 5. Compartment B contains the instrumentation 62 for controlling the temperature of compartments A and B. It also contains a storage and dispensing mechanism 50 for the dairy products. The mechanism 50 is similar in design to that of the mechanism 40 in the sharp freezing chamber A. It is a conveyor 51 supported by the standards 52. Conveyor 51 is driven by motor 53. The conveyor 51 is preferably of the same design as that previously described in relation to the conveyor 41. The mechanism 50 has a chute 54 on which the dairy products slide from conveyor 51 onto the conveyor 20. In this example, the dairy product is milk. It should be realized, however, that butter, cottage cheese and other types of dairy products can be vended out of this machine by providing additional conveying units.

The temperature in the compartment B is normally maintained slightly above freezing. This is accomplished usually by leakage from the compartment A. However, there is provided a separate refrigerating unit (not shown) which is connected to the motor 57 (Fig. 2). The motors 47 and 57 are controlled by a thermostat in the compartments A and B. In many cases the compressor 57 and its refrigerating unit can be entirely eliminated if proper leakage is established between compartments A and B.

The dispenser chute 30 opens directly into the compartment B. This requires the frozen articles from compartment A to pass through compartment B before passing into the chute 30.

The conveyor 20, as best shown in Figs. 1 and 3, consists of an endless belt 21 mounted at each end on the rollers 22. One of the rollers 22 is driven by a motor 27 located in compartment B. The conveyor has sides 24 on each side of the belt to prevent the articles from sliding off. The belt extends almost the entire width of the housing 1. Thus it traverses or extends laterally across both compartments A and B. It is located at the very ends of the conveyors 41 and 51 (Fig. 1) so that the articles dispensed therefrom fall on the belt 21.

Figure 7:
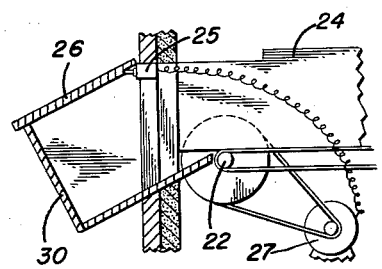
Fig. 7 shows an enlarged, partial, sectional view of the lateral conveyor, such view taken along the plane VII—VII of Fig. 1.

The motor 27 is controlled by a switch 25 (Fig. 7) located at the outlet chute 30. Switch 25 is actuated by the cover 26 of the chute 30. When the cover or lid 26 is lifted the circuit through the motor 27 is closed causing the motor to actuate the conveyor 21 and carry the dispensed articles from compartment A or compartment B to the chute 30.

Figure 6:
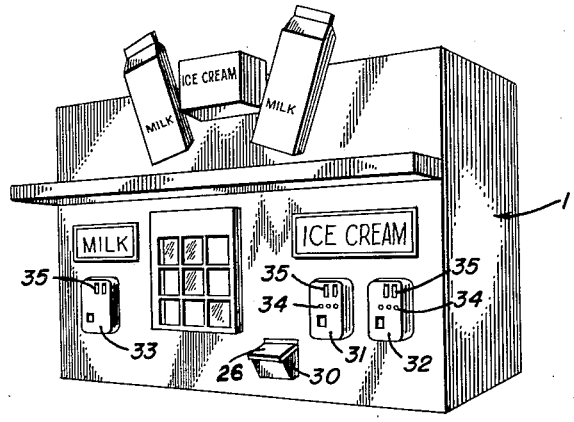
Fig. 6 shows an oblique, front, elevational view of the vending machine.

On the exterior of the housing 1 are the coin control boxes 31, 32 and 33 (Figs. 1 and 6) which control the operation of the motors 4 3and 53. These boxes each have coin slots 35 in which coins are inserted for actuating a switch that controls a conveyor motor. Boxes 31 and 32 also have selector buttons for selecting the flavor of ice cream dispensed from the machine. The coin mechanisms in boxes 31 and 32 control certain of the motors 43 for the conveyors 41 in the compartment A. The coin mechanism in box 33 controls the conveyor motors 53 for the conveyors 51.

It should be understood that the particular arrangement for the control of the motors 43 and 51 can vary depending on the number of different articles sold. In the preferred form of this invention concerning the dispensing of ice cream, the coin box 31 controls the dispensing of pint size ice cream cartons; coin box 32 controls the dispensing of half gallon size cartons; and coin box 33 controls the dispensing of the milk carried by the conveyor 51. The coin boxes 31 and 33 have several other selective controls; for example, the particular flavor of ice cream. For each of these controls, that is, for each flavor and carton size of ice cream provided to actuate certain rows and tiers of the conveyors 41. The particular tier or row which is actuated by the coin box can be varied without departing from the scope of this invention.

On the outside of the housing 1 is also located appropriate advertising material. For example, replicas of ice cream and milk cartons are shown at the top of the housing. The center of the housing has a glass encasement giving the effect of a picture window. A farm scene or other decorative poster is displayed in this window.

Operation

The operation of this vending machine or unit is comparatively easy. As previously stated compartment A is maintained at a temperature well below zero degrees Fahrenheit. 10 F. is preferred for maintaining the hardness of the ice cream. The compressor 47 is controlled by a thermostat which maintains this temperature in compartment A. The fan 46 may also be controlled by such thermostat. Preferably, sufficient leakage is maintained between or in the partition 10, either through the opening 13 or in the joints of the doors 11, to maintain the temperature in compartment B at slightly above freezing. 36° F. is preferred. A thermostat is located in compartment B for controlling the ½ horse-power compressor 57 that is connected to a refrigerating unit (not shown) in compartment B for helping to maintain the desired temperature. The brine plate or tank 48 located above the conveyors 41 helps to maintain an even temperature in the compartment A and at the same time serves as a safety measure for maintaining such temperature in case of power or compressor failure. Sufficient insulation is provided on the outside of the housing 1 to maintain the desired temperatures.

A purchaser desiring to buy either ice cream or dairy products simply places the appropriate amount of change in a selected one of the coin boxes 31, 32, and 33. For example, if the purchaser desires a half gallon of ice cream, he inserts the appropriate amount of change in the slots 35 of the coin box 32. He then pushes a selector button which selects the flavor of ice cream. After inserting the required coins in the slots 35 and pushing desired selector 34 to select the flavor ice cream, the coin mechanism 32 closes an appropriate circuit through one of the motors 43. This sets the conveyor into operation carrying one of the cartons of ice cream to one of the chutes 44 where it slides onto the conveyor belt 20. The purchaser then lifts the lid 26 (Fig. 7) closing switch 25, actuating motor 27, thus setting the conveyor 20 into operation. The ice cream is transported by conveyor 20 from the compartment A through the opening 13, through a compartment B, and into the chute 30 where it is accessible to the purchaser.

If a purchaser desires milk he drops the appropriate change into box 33 which sets the motor 53 into operation resulting in one of the cartons of milk dropping onto conveyor 20. Subsequent lifting of the lid 26 causes the conveyor 20 to transport the milk into the chute 30 where it is accessible to the purchaser.

During this entire operation the humid and warm air on the outside of the housing 1 does not pass into compartment A. Therefore no condensation of such air results and consequently no frosting or icing of the mechanism results. Some of the air does pass into the compartment B but no frosting or icing occurs because the temperature differential is not sufficient to cause flash condensation and freezing. As a result of this arrangement the entire mechanism in the unit is entirely frost free.

Refilling the unit is simple and is accomplished without affecting the mechanism in either compartment. The attendant enters the compartment B through the door 12. He has direct access to the conveyor 51 and thus can fill the conveyor with the milk or other dairy products. Access to the sharp freezing compartment and to the conveyors 41 in the sharp freezing compartment A is through the doors 11. Ice cream cartons or other frozen articles are arranged on the conveyors in rows as shown depending upon the particular rows which are actuated by the motors. Excess ice cream or other frozen articles can be stored underneath the conveyors 41 (Fig. 4). This entire filling of the compartment A is accomplished with very little discomfort or peril to the health of the attendant. Furthermore, with the door 12 closed the air outside of the housing 1 does not contact the cold components of the sharp freezing compartment A. As a result there is no flash condensation and frosting or icing on the dispensing mechanism 40.

This particular arrangement of the conveyor extending transversely through both compartments A and B eliminates the usual requirement of two separate conveyors. It eliminates any frosting or icing of the various components of the mechanism in compartment A or B and it conserves the cool air in compartment A. It utilizes any leakage from compartment A into the compartment B by making compartment B a storage and dispensing chamber for dairy products. As a result it substantially decreases the cost of operation of the entire unit.

It should be understood that although I have disclosed specific modifications of my invention several other embodiments can be used without departing from the scope thereof. Therefore, all these embodiments and modifications should be considered to fall within the spirit and scope of this invention unless the appended claims expressly state otherwise.

I claim:

1. A vending machine for articles, comprising: a freezing compartment for storing frozen articles; means for maintaining said freezing compartment at sub-freezing temperatures; a second compartment adjacent said freezing compartment; means for normally maintaining said second compartment at temperatures slightly above freezing; a fixed partition having aperture means forming said first and second compartments, continuous conveying means extending from said freezing compartment transversely through said partition aperture means and said second compartment to the outside of the vending machine; said second compartment being of a size to substantially isolate said first compartment from ambient air on the outside of the machine and thereby substantially eliminate condensation caused by ambient air reacting with air at sub-freezing temperatures, said freezing compartment having means for storing frozen articles and dispensing said frozen articles onto said conveying means; said dispensing means actuated by a coin control box; said second compartment having means for storing articles and dispensing said articles onto said conveyor means; and said dispensing means in said second compartment actuated by a coin control box.

2. A vending machine for articles, comprising: a freezing compartment for storing frozen articles; means for maintaining said freezing compartment at sub-freezing temperatures; a second compartment adjacent said freezing compartment; means for normally maintaining said second compartment at temperatures slightly above freezing; a fixed partition having aperture means forming said first and second compartments, said aperture means including loading doors between said compartments permitting the loading of said freezing compartment from said second compartment; an outlet to said machine located in said second compartment; continuous conveying means extending from said freezing compartment transversely through said aperture means and said second compartment to the outside of the vending machine; said second compartment being of a size to substantially isolate said first compartment from ambient air on the outside of the machine and thereby substantially eliminate condensation caused by ambient air reacting with air at sub-freezing temperatures, said freezing compartment having means for storing frozen articles and dispensing said frozen articles onto said conveying means; said dispensing means actuated by a coin control box; said second compartment having means for storing articles and dispensing said articles onto said conveyor means; and said dispensing means in said second compartment actuated by a coin control box.

References Cited in the file of this patent

UNITED STATES PATENTS

| | | |
|---|---|---|
| 1,955,669 | Botz | Apr. 17, 1934 |
| 2,484,572 | Jude | Oct. 11, 1949 |
| 2,513,355 | Peckinpaugh | July 4, 1950 |
| 2,621,994 | Sadler | Dec. 16, 1952 |
| 2,644,734 | Gabrielsen | July 7, 1953 |